July 30, 1968
A. A. SCOTT
3,394,687
TEMPERATURE RESPONSIVE CONTROL
Filed April 8, 1966
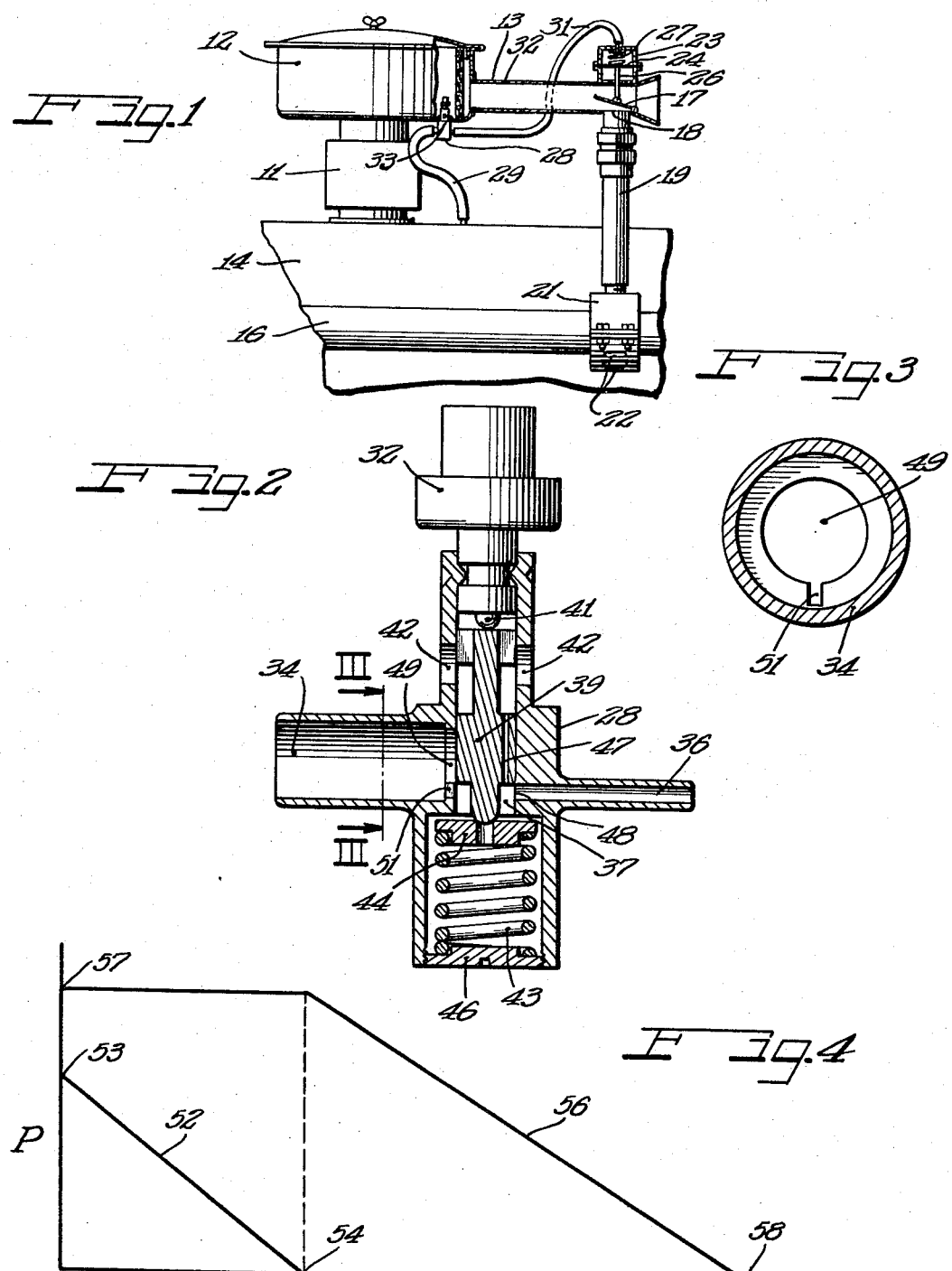
INVENTOR.
Arthur A. Scott
BY *Hill, Sherman, Meroni, Gross & Simpson* ATTORNEYS

---

United States Patent Office 3,394,687
Patented July 30, 1968

---

3,394,687
TEMPERATURE RESPONSIVE CONTROL
Arthur A. Scott, Chicago, Ill., assignor to The Dole Valve Company, Morton Grove, Ill., a corporation of Illinois
Filed Apr. 8, 1966, Ser. No. 541,353
11 Claims. (Cl. 123—119)

The present invention relates to a means and method for automatically controlling the temperature and quantity of air fed to the cylinders of an internal combustion engine as a function of the temperature of air ambient the engine itself and more particularly relates to such a system employing a unique dual function temperature responsive pneumatic control actuator assembly for performing this function.

The usual internal combustion engine employs a carburetor for the purpose of mixing air with a vaporized fuel mixture and means, including the intake manifold, for conveying the fuel-air mixture to the cylinders for combustion. It has been discovered that fuel economy can be markedly increased if the temperature of air entering the carburetor throat is maintained within the temperature range of 100 to 120° F. It has also been discovered that engine warmup can be achieved more rapidly and that there is less likelihood of stalling under cold weather conditions if the temperature of air fed into the carburetor throat is maintained within this temperature range.

It has also been discovered that by increasing the quantity of air fed to the intake manifold just prior to entry of the fuel-air mixture into the cylinders, when the engine is running hot, the percentage of carbon monoxide and olefins in the exhaust gas can be significantly reduced. These latter products are some of the major constituents of smog and any means for significantly eliminating them from the atmosphere is much sought after.

Very briefly, the principal subject of the present invention comprises a single low cost dual function valve and an associated pneumatic actuator. These devices are preferably associated with the intake throat of the usual carburetor-mounted air cleaner and serve to govern the temperature of air directed to the intake throat of the carburetor in the following manner. A hot air port opens through a side wall of the intake throat of the air cleaner and means are provided for directing a flow of hot air to this port. A valve member is associated with the flow port to control the flow of hot air through that port. The dual function valve above referred to is actuable in response to temperature variances sensed in the air cleaner throat downstream of the hot air port and means are provided for operating the valve member cooperable with the hot air port as a function of the sensed temperature. Thus, air under the hood and ambient the engine enters the engine through the normal intake funnel and mixes with hot air passing through the hot air port. The mixed air passes over a temperature sensing device downstream of this point of confluence and if the sensed air temperature is below a predetermined critical point, then the dual function valve referred to is effective to move the valve member cooperable with the hot air port to permit a larger flow of hot air into the air cleaner throat. The converse is also true so that the temperature of air passing through the air cleaner and entering the intake throat of the carburetor can always thereby be maintained above a predetermined critical point, thus resulting in improved fuel economy and much better engine operation in cold ambient air conditions.

The dual function valve above referred to is so named because it performs two completely independent functions with a single valve member. One function has been briefly alluded to above. The second function performed by the valve is that of governing the quantity of air directed to the intake manifold as a function of engine temperatures. Suffice it to say at this point that when the dual function valve senses that the engine is running hot, then a supplementary supply of air is fed directly into the intake manifold and the rate of flow of this air is governed as a function of the sensed heat of the engine.

It is therefore a principal object of the present invention to provide a means for increasing the operating efficiency of an internal combustion engine and for significantly reducing the quantity of noxious gases produced by combustion by regulating the temperature of air passed through the carburetor for mixture with fuel and by regulating the quantity of air mixed with the fuel as a function of the temperature of air ambient the engine and as a function of the temperature of the engine itself.

More specifically, one object of the invention resides in the provision of a means for introducing hot air to the main flow stream of air entering the carburetor and for regulating the proportion of hot air to the normal air flow stream as a function of the temperature of the mixed air.

Yet another object of the invention is directed to the provision of a pneumatically actuable control device for performing the function referred to in the preceding paragraph and to the provision of a single, simple temperature responsive valve assembly for controlling operation of the pneumatic actuator, which valve assembly is sensitive to the temperature of mixed air downstream of the point of confluence of the hot air stream and normal air flow stream.

A still further object of the invention resides in the provision of an assembly of the type above described wherein the single temperature responsive valve unit referred to above is also effective to control the rate of flow of air to the intake manifold of an internal combustion engine.

These and other objects, advantages, and features of the present invention will become apparent from time to time as the following specification proceeds and with reference to the accompanying drawing, wherein:

FIGURE 1 is a fragmentary, diagrammatic side elevational view partly in section of a portion of an internal combustion engine employing a thermostatically controlled regulating system in accordance with the principles of the present invention;

FIGURE 2 is a vertical sectional view of the dual-function valve referred to herein but with one part shown in side elevation for the purpose of clarity;

FIGURE 3 is a vertical sectional view through part of the valve of FIGURE 2 taken substantially along the lines III—III of FIGURE 2; and FIGURE 4 is a graph useful in understanding the operation of the invention.

The instant invention may be characterized as being embodied in an arrangement wherein a flapper valve is provided in the throat of air air cleaner for a carburetor for adding hot air to the ambient air entering the air cleaner. This flapper valve is coupled to a stove heated by means of the exhaust manifold for conveying hot air to the air cleaner. The flapper valve is controlled by a spring-biased diaphragm which in turn is controlled by a regulating valve. The regulating valve controllably couples vacuum or negative pressure from the intake manifold to the diaphragm for moving the diaphragm in response to the negative pressure, thereby opening the flapper valve to enable hot air to enter the air cleaner throat. The regulating valve is actuated by means of a temperature responsive force transmitting device having a sensing element positioned in the throat of the air cleaner. As the temperature increases, the regulating valve reduces the negative pressure to thereby allow the diaphragm to be retracted by the biasing spring causing the flapper valve to move into a closed position. As the temperature of the air passing over the sensing element reaches 150° F. the negative pressure is completely sealed off from the diaphragm, thereby causing the spring to completely close the flapper valve to prevent additional hot air from entering the throat of the air cleaner. As the ambient air increases from 150° F., air is enabled to enter a vent in the regulating valve and is controllably coupled to the intake manifold to thereafter increase the amount of air in the mixture of air and fuel from the carburetor, thereby reducing the amount of air pollution caused by incomplete combustion.

Referring now to FIGURE 1, a portion of an internal combustion engine is illustrated as having a carburetor 11 for mixing fuel with air from the atmosphere to provide an explosive mixture for operating the engine, an air cleaner 12 connected to the carburetor 11 for filtering the air which enters the carburetor via a throat 13, which throat is opened to the atmosphere, an intake manifold 14 which conveys the explosive mixture from the carburetor 11 to the cylinders of the engine, and an exhaust manifold 16 which transmits the exhaust gases from the cylinders to the atmosphere.

A flapper valve 17 is pivotally mounted on the inner surface of the throat 13 to enable hot air to enter the throat 13 via an aperture 18 located in the lower portion of the throat. This aperture 18 is connected to a conduit 19 for conveying hot air from a stove 21, which surrounds a portion of the exhaust manifold 16. Air from the atmosphere enters a plurality of apertures 22 located at the bottom portion of the stove 21. This air then moves through the stove 21 and is heated by means of the close contact between the stove 21 and the hot exterior walls of the exhaust manifold 16. This hot air is thence conveyed via the conduit 19 to the throat 13 through the aperture 18 to mix with the ambient air rushing into the throat 13, thereby causing the air which enters the air cleaner 12 to be heated to an elevated temperature.

Movement of the flapper valve 17 is controlled by means of a vacuum motor 23. This vacuum motor 23 comprises a diaphragm 24 connected to the flapper valve 17 by means of a rod 26 and a bias spring 27 for resiliently urging the diaphragm 24 in a downward direction. The spring 27 resiliently urges the diaphragm 24 and thence the rod 26 downwardly, which tends to move the flapper valve 17 into a closed position to seal off the aperture 18. However, vacuum or negative pressure is communicated to the top portion of the vacuum motor 23 which draws the diaphragm upwardly against the force of the spring 27 to thereby cause the flapper valve 17 to assume an open position. Therefore, the flapper valve 17 controls the amount of hot air which enters the throat 13 in response to the amount of negative pressure coupled to the motor 23.

A regulating valve 28 communicates negative pressure from the intake manifold 14 via a tubing 29 to another tubing 31 and thence to the top portion of the motor 23. The valve 28 regulates the amount of negative pressure from the intake manifold to the motor 23 in response to changes in temperature in the throat 13. A temperature responsive force transmitting device 32 having a sensing element positioned in the throat 13 downstream of the aperture 18 senses the changes in temperature of air within the throat 13 to cause the required regulation of the negative pressure to the vacuum motor 23. This temperature responsive force transmitting device 32 is integrally connected to the regulating valve 28, and the regulating valve 28 is in turn mounted on the throat 13 by means of a set of brackets 33.

Referring now to FIGURE 2, the valve body of the regulating valve 28 may be a one-piece structure formed of either die-cast materials or thermoplastic and having an inlet 34 and an outlet 36 and a passageway 37 communicating the said inlet with the said outlet. The inlet 34 is connected to the tubing 29 for coupling the negative pressure from the intake manifold 14 to the passageway 37. The outlet 36 is coupled to the tubing 31 for coupling a controlled amount of negative pressure to the vacuum motor 23.

A cylindrically configurated valve member 39 is slidably guided within the passage 37. This valve member 39 extends downwardly in response to energization of the temperature responsive force transmitting device 32. This device 32 has a piston 41 which moves extensibly downwardly to force the valve member 39 in a downwardly direction, in response to changes in temperature within the throat 13. The valve member 39 is illustrated in FIGURE 2 in its uppermost position enabling a maximum amount of communication to occur between the inlet 34 and the outlet 36. As the valve member 39 is moved downwardly by the temperature responsive force transmitting device 32, a smaller amount of negative pressure is communicated from the inlet 34 to the outlet 36, until the member 39 seals off the inlet 34 from the outlet 36; at which point air from the atmosphere is permitted to enter the inlet 34 from a set of four ports 42 via the passageway 37. This result is produced by the shape of the valve member 39 as this member has a relative narrow upper portion and a relatively narrow lower portion.

The valve member 39 is fluted at its upper end portion immediately below the force transmitting device 32 so that a flow passage is provided intermediate the valve member and its guide to permit a free flow of air between ports 42 and port 49 when the valve member 39 has uncovered the latter. At the lower portion of the valve member 39, a spring 43 provides a necessary force to return the valve member 39 and thence the piston 41 into the force transmitting device 32. One end of the spring 43 is connected to an articulating plate 44 which is used to eliminate side or eccentric loading of the valve member 39. A calibration screw plate 46 is threadably mounted within the lower end of the housing and serves as a support for the lowermost end of the spring 43. Rotation of the screw plate in the housing has the effect of moving the plate axially therein, and hence changes the compression of the spring and thereby changes the bias on the valve member.

A bleed port 47 provided in the valve member 39 enables a pressure increase in the outlet 36 as an entrance 48 to the outlet 36 is reduced by means of the valve memebr 39 to an area equal to the area of the bleed port 47.

The inlet 34 has two separate ports, an upper port 49 and a lower port 51. The upper port 49 is blocked by the valve member 39 in the position as assumed in FIGURE 2 which enables the inlet 34 to communicate through the outlet 36 via the lower port 51. As the valve member 39 moves downwardly in response to increases in temperature, the lower port 51 is blocked by the valve member 39, and ultimately is entirely sealed off by means of the valve member 39, at which point the upper port 49 commences to provide communication between the inlet port 34 and the four ports 42. The middle portion of the valve member 39 is constructed so that the lower port 51 becomes completely blocked at the same instant in time as the upper port 49 commences to open for providing communication.

Referring now to FIGURE 3, a cross-sectional view taken substantially along the line III—III as shown in FIGURE 2 discloses the area of the upper port 49 and the lower port 51. These cross-sectional areas are preferred, but it is to be understood that other cross-sectional areas may be employed.

Referring now to FIGURE 4, both functions of the regulating valve 28 are illustrated graphically. The first function of the valve 28 is to control the amount of vacuum to the vacuum motor 23 in such a manner that this vacuum or negative pressure decreases linearly as the temperature of the temperature responsive force transmitting device 32 is increased, even though the source of negative pressure remains substantially constant from the intake manifold 14. This function is illustrated by means of a graph 52. The ordinate for this graph measures vacuum or negative pressure, and, therefore, as the values decrease along the ordinate the pressure is increasing due ot the fact that the ordinate measures pressure negatively. The ordinate measures temperature in degrees Fahrenheit. At a point 53 where the abscissa is equal to 0, the negative pressure is substantially equal to 15 inches of mercury. Where the graph 52 intercepts the abscissa at 0 inch of mercury or atmospheric pressure at a point 54, the temperature is substantially equal to 150° F.

The second function of the regulating valve 28 is to provide air from the atmosphere via the four ports 42 to the inlet 34 and thence to the intake manifold 14 thereby reducing the amount of air pollution caused by the exhaust gases. Therefore, the source of negative pressure is to decrease linearly with respect to increasing temperature after 150° F. has been attained for the air within the throat 13 of the air cleaner 12. This second function is represented by a graph 56. The graph 56 intercepts the ordinate at point 57, which is substantially equal to 20 inches of mercury of negative pressure or vacuum. It can be noted that at the point 53 for the first function, the pressure is less than the pressure at the point 57, because the negative pressure is reduced at the outlet 36 due to the restricted area of the port 51. The graph 56 illustrates that the negative pressure of the source, namely the negative pressure within the intake manifold 14, remains substantially constant with respect to temperature from point 57 to a temperature of approximately 150° F. at the point 54. Thereafter, the negative source of pressure decreases linearly with respect to temperature until a point 58 is reached, which is at a negative pressure of 0 inch of mercury or atmospheric pressure.

Any reversal or decreasing temperature causes either function to reverse, depending on the temperature, to reverse as the valve 28 is completely reversible.

It will be observed that a regulating valve having two functions has been provided in accordance with the object of this invention as the main component of a temperature closed loop or feedback system to control the temperature of the air entering a carburetor for an internal combustion engine and secondly, to cause air to enter the intake manifold for the internal combustion engine to control air pollution by providing better combustion.

It will be understood that this embodiment of the present invention has been used for illustrative purposes only and that various modifications and variations in the instant invention may be effected without departing from the spirit and scope of the novel concepts thereof.

I claim as my invention:

1. A pressure control valve comprising:
   a valve body having an inlet, an outlet, a vent port, and a passageway communicable with said inlet, outlet, and vent port;
   valve means operatively disposed within said passageway for successively and controllably closing said inlet relative to said outlet and opening said inlet relative to said vent port;
   a temperature responsive force transmitting device operatively connected to said valve means; and
   said temperature responsive force transmitting device causing said valve means to close said inlet relative to said outlet upon a temperature rise ambient said device and to progressively open said inlet relative to said vent port upon a further temperature rise ambient said device.

2. A pressure control valve in accordance with claim 1 wherein said temperature responsive force transmitting device comprises a casing having a thermally expansible material therein and having an associated power member operatively contacting said thermally expansible material for being relatively extensible from said casing upon a temperature rise ambient said dtvice.

3. A pressure control valve in accordance with claim 1 wherein said valve means comprises a valve piston slidably received within said passageway,
   said valve piston being progressively advanced from a first to a second end of said passageway by said temperature responsive force transmitting device; and
   said vent port, inlet, and outlet being communicable with said passageway at points extending progressively from said first end to said second end thereof.

4. A pressure control valve in accordance with claim 3 wherein said vent port is disposed in the vicinity of a first end of said passageway, said outlet is disposed in the vicinity of a second end of said passageway, and said inlet is formed substantially intermediate said vent port and said outlet, said inlet and outlet being formed at the longitudinal walls of said passageway, said inlet being larger than said outlet and having a portion thereof aligned with said outlet.

5. A pressure control valve in accordance with claim 4 wherein said inlet comprises a large opening having a relatively smaller connected port, said smaller port being in substantial alignment with said outlet.

6. A pressure control valve in accordance with claim 3 wherein said valve piston is initially positioned in said passageway between said vent port and said outlet for opening said inlet relative to said outlet and closing said inlet relative to said vent port, said valve piston being successivtly positioned against said inlet for closing the inlet relative to said outlet and said vent port, and said valve piston being finally positioned in said passageway against said outlet for opening said inlet relative to said vent port and closing said inlet relative to said outlet.

7. A pressure control valve in accordance with claim 6 wherein a bleed port is formed within said valve piston, said bleed port connecting said outlet to said vent port, and said bleed port having a diameter substantially less than the diameter of said inlet.

8. The combination comprising:
   a carburetor having air intake means;
   said air intake means having a first inlet for receiving ambient air thereinto and a second inlet for receiving heated air from a warm air supply source;
   a flapper valve operatively disposed within said air intake for proportioning the air flow from said first and second inlets;
   a vacuum motor operatively connected to said flapper valve for controlling the functioning thereof;
   a vacuum supply fetd line for being connected from an associated intake manifold to said vacuum motor;
   a vacuum control valve connected within said vacuum supply line for regulating the degree of vacuum delivered thereby to said vacuum motor;
   said vacuum control valve having a thermal power unit including a casing and a relatively extensible power piston operatively connected to the interior of said air intake for sensing the air temperature therein and for regulating the vacuum at said vacuum motor in response thereto; and
   said vacuum control valve having means for venting the line portion leading to an associated intake manifold to the atmosphere in response to a predetermined temperature rise ambient said thermal power unit.

9. The combination in accordance with claim 8 wherein said vacuum control valve comprises:
   a valve body having an inlet, an outlet, a vent port, and a passageway communicable with said inlet, outlet, and vent port;
   valve means operatively disposed within said passageway for successively and controllably closing said inlet relative to said outlet and opening said inlet relative to said vent port;
   said thermal power unit comprising a temperature responsive force transmitting device operatively connected to said valve means; and said temperature responsive force transmitting device causing said valve means to close said inlet relative to said outlet upon a temperature rise ambient said device and to progressively open said inlet relative to said vent port upon a further temperature rise ambient said device.

10. A pressure control valve in accordance with claim 9 wherein said valve means comprises a valve piston slidably received within said passageway;

said valve piston being progressively advanced from a first to a second end of said passageway by said temperature responsive force transmitting device; and said vent port, inlet, and outlet being communicable with said passageway at points extending progressively from said first end to said second end thereof.

11. In combination in an internal combustion engine having a carburetor for mixing fuel and air and a manifold for conveying the fuel air mixture to a combustion chamber, the improvement of means for regulating the temperature of air directed to the carburetor and the quantity of air directed to the combustion chamber comprising:

an air flow conduit having an open mouth for conveying air ambient the engine to said carburetor, a source of hot air, a port opening through a wall of said conduit, means communicating hot air from said source to said port to mix the hot air with air passing through said mouth, a flapper valve member cooperable with said port to control the rate of flow of hot air therethrough, a thermal sensitive actuator having a thermal sensing portion in heat transfer relationship with the mixed air in said conduit downstream of said mouth and port and having an element extensible therefrom upon predetermined increases in temperatures ambient the thermal sensing portion thereof, a valve body having a vent port and spaced first and second ports opening to a common chamber, means communicating the interior of the manifold with said first port, a valve member movable within said valve body to open and close communication between said first port and said vent port, means interconnecting the element of said thermal power unit with said valve member to effect movement of said valve member to a position communicating said first port with said vent port, spring means biasing said valve member in an opposite direction, said valve member being movable to close communication between said second port and said first port when said first port is communicable with said vent port, a vacuum actuator associated with said flapper valve member for operating said flapper valve and comprising a housing having a diaphragm extending thereacross, spring means biasing said diaphragm in one direction, means communicating the chamber on the opposite side of said diaphragm within said housing with said second port, whereby communication of said second port with said chamber in said vacuum actuator when said reciprocal valve member is in position to communicate said first and second ports will be effected to urge said flapper valve member to a port-open position, and wherein movement of said reciprocal valve member by energization of said thermal sensitive element will be effective to close said second port and open communication between said first port and said vent port to thereby permit said biasing means in said vacuum actuator to close said flapper valve member and will permit air from said vent port to be drawn through said first port into the manifold.

References Cited

UNITED STATES PATENTS

| | | | |
|---|---|---|---|
| 1,208,598 | 12/1916 | Mackey | 137—625.4 |
| 1,211,636 | 1/1917 | Spray | 123—122 XR |
| 1,988,545 | 1/1935 | Donn | 137—625.4 |
| 2,082,397 | 6/1937 | Hiscock | 123—122 XR |
| 2,661,148 | 12/1953 | Englander | 236—99 XR |
| 2,781,032 | 2/1957 | Sebok et al. | 123—122 |
| 2,839,039 | 6/1958 | Obermaier | 123—122 |
| 2,883,112 | 4/1959 | Stoltman | 123—119 XR |

FOREIGN PATENTS

| | | |
|---|---|---|
| 766,303 | 1/1957 | Great Britain. |

WILLIAM F. O'DEA, *Primary Examiner.*

R. GERARD, *Assistant Examiner.*